(12) United States Patent
Tramoni

(10) Patent No.: US 11,914,450 B2
(45) Date of Patent: Feb. 27, 2024

(54) ELECTRONIC DEVICE POWERING

(71) Applicant: STMicroelectronics (Rousset) SAS, Rousset (FR)

(72) Inventor: Alexandre Tramoni, Le Beausset (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 55 days.

(21) Appl. No.: 17/838,157

(22) Filed: Jun. 10, 2022

(65) Prior Publication Data

US 2023/0004212 A1 Jan. 5, 2023

(30) Foreign Application Priority Data

Jun. 24, 2021 (FR) ...................................... 2106785

(51) Int. Cl.
 *G06F 1/32* (2019.01)
 *G06F 1/3296* (2019.01)
 *G06F 1/3203* (2019.01)

(52) U.S. Cl.
 CPC .......... *G06F 1/3296* (2013.01); *G06F 1/3203* (2013.01)

(58) Field of Classification Search
 CPC .... G06F 1/3296; H04B 5/0037; H04B 5/0056
 USPC ........................................................ 713/320
 See application file for complete search history.

(56) References Cited

U.S. PATENT DOCUMENTS

| | | | | |
|---|---|---|---|---|
| 9,424,447 | B2* | 8/2016 | Puleston | H04L 67/04 |
| 11,751,869 | B2* | 9/2023 | Shelton, IV | A61B 90/98 |
| | | | | 227/180.1 |
| 2012/0270496 | A1* | 10/2012 | Kuenzi | G07C 9/00309 |
| | | | | 340/5.28 |
| 2013/0295843 | A1* | 11/2013 | Tian | H04B 1/40 |
| | | | | 455/41.1 |
| 2013/0295996 | A1* | 11/2013 | Yeh | G06F 12/0246 |
| | | | | 455/558 |
| 2014/0189406 | A1* | 7/2014 | Hung | G06F 1/1698 |
| | | | | 713/323 |
| 2015/0082011 | A1* | 3/2015 | Mellinger | G11C 29/021 |
| | | | | 713/1 |
| 2019/0369711 | A1* | 12/2019 | Wang | G06F 1/3212 |
| 2023/0004212 | A1* | 1/2023 | Tramoni | H04B 5/0037 |

* cited by examiner

*Primary Examiner* — Volvick Derose
(74) *Attorney, Agent, or Firm* — Slater Matsil, LLP

(57) ABSTRACT

In an embodiment, an electronic device includes a first near field communication module, at least one second communication module, at least one portion of a volatile memory, at least one register, and at least one first circuit configured to activate the near field communication module, wherein the at least one second communication module is configured to power the at least one portion of the volatile memory, the at least one register and the at least one first circuit with a first supply voltage when the electronic device is in an on state and when the first near field communication module is in a standby mode.

18 Claims, 4 Drawing Sheets

ELECTRONIC DEVICE POWERING

CROSS-REFERENCE TO RELATED APPLICATIONS

This application claims the benefit of French Application No. 2106785, filed on Jun. 24, 2021, which application is hereby incorporated herein by reference.

TECHNICAL FIELD

The present disclosure relates generally to electronic systems and devices, and to powering such systems and devices. More particularly, the present disclosure relates to electronic devices adapted for Near Field Communication (NFC).

BACKGROUND

Wireless communications are increasingly used nowadays for various applications such as information exchange, bank payments, energy exchange, etc. There are several types of wireless communication, for example, Near Field Communication (NFC), communications using high frequencies at longer distances such as Bluetooth communications, etc.

SUMMARY

Embodiments improve at least in part certain aspects of known devices related to near field communication technology.

Embodiments provide devices suitable for near field communication technology that consume less power.

One embodiment addresses all or some of the drawbacks of known devices adapted to near field communication technology.

One embodiment provides a device adapted to near-field communication technology consuming less power.

One embodiment provides for an electronic device comprising:
 a first near field communication module;
 at least a second communication module;
 at least a portion of a volatile memory;
 at least one register; and
 at least a first circuit adapted to activate the near field communication module, wherein, when the electronic device is in the on state and when the near field communication device is in a standby mode, then the group consisting of the at least a portion of a volatile memory, the at least one register, and the at least one first circuit is powered by a first supply voltage of the at least one second communication module of the device.

Another embodiment provides a method for powering an electronic device comprising:
 a first near field communication module;
 at least one second communication module;
 at least a portion of a volatile memory;
 at least one register; and
 at least a first circuit adapted to activate the near field communication module, wherein, when the electronic device is in the on state and when the near field communication device is in a standby mode, then the group consisting of the at least one portion of a volatile memory, the at least one register, and the at least one first circuit is powered by a first supply voltage of the at least one second communication module of the device.

According to one embodiment, the at least one first circuit comprises an internal communication bus of the device, and/or a state machine adapted to detect the state of the first module.

According to one embodiment, the device comprises power supply circuits comprising a battery, at least one first voltage regulator, and at least one node transmitting the first supply voltage to the at least one second communication module of the device.

According to one embodiment, when the electronic device is in the on state and when the first near field communication module is active, then all the circuits of the device, with which the first module is adapted to communicate, are powered by the first voltage regulator, the first voltage regulator being adapted to provide a second supply voltage equal to the first supply voltage from a third supply voltage provided by the battery.

According to one embodiment, when the device is in the off state and when the near field communication module is active, then all the circuits in the device, with which the first module is adapted to communicate, are powered by the first voltage regulator.

According to one embodiment, when the first near field communication module is inactive then none of the circuits of the device, with which the first module is adapted to communicate, are powered by the power module.

According to one embodiment, the first power supply voltage is between 1 and 1.5 V.

According to one embodiment, the power supply circuits of the device further comprise a second voltage regulator adapted to provide a fourth supply voltage equal to the first supply voltage from a third supply voltage provided by the battery.

According to one embodiment, the first voltage regulator provides a first current equal to at least ten times a second current provided by the second voltage regulator.

According to one embodiment, when the device is in the off state and when the first near field communication module is in a standby mode, then all the circuits in the device, with which the first module is adapted to communicate, are powered by the second voltage regulator.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional, and material properties.

For the sake of clarity, only the operations and elements that are useful for an understanding of the embodiments described herein have been illustrated and described in detail. In particular, the Near Field Communication (NFC) protocols and technologies will not be detailed exhaustively hereafter.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
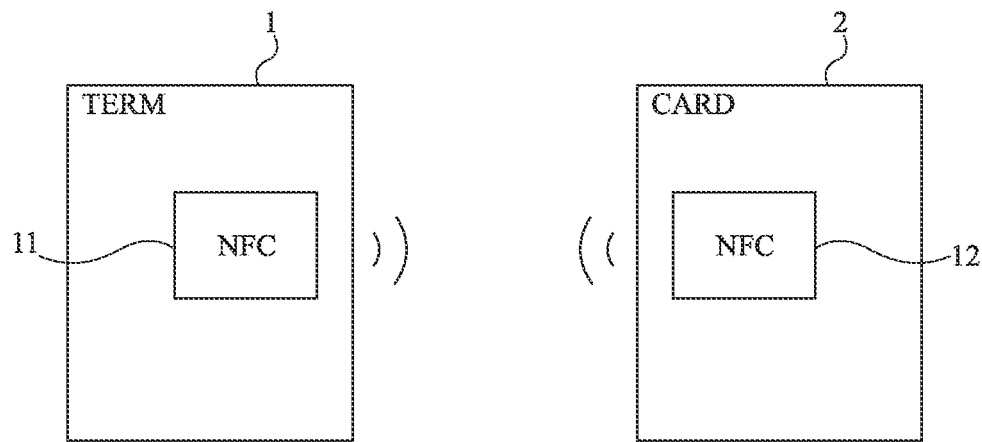
FIG. 1 represents, in a very schematic way and in block form, an example of near field communication.

FIG. 1 represents schematically a wireless communication, and more particularly, a near field communication between electronic devices 1 (TERM) and 2 (CARD).

Near Field Communication (NFC) technologies allow short range, high frequency communications. Such systems exploit a radio frequency electromagnetic field emitted by a device (terminal or reader) to communicate with another device (transponder or card).

In recent systems, the same device can operate in card mode or in reader mode (for example in the case of near field communication between two cell phones). It is then common for devices to be battery powered and their functions and circuits to be put on standby so as not to consume power between periods of use. The devices must then be "woken up" when they are within range of each other.

The case of the two electronic devices 1 and 2 is assumed, where, for example, the device 1 is a terminal, or reader, and device 2 is a transponder, but all that will be described applies more generally to any system in which a transponder picks up an electromagnetic field radiated by a reader, or terminal.

According to the applications, for a communication, one of the devices operates in a so-called reader mode while the other operates in a so-called card mode, or the two devices communicate in a peer-to-peer (P2P) mode. Each device includes various electronic circuits 11 (NFC) and 12 (NFC), or NFC modules 11 and 12, for generating a radio frequency signal transmitted by an antenna of an oscillating/resonant circuit. The radio frequency field generated by one of the devices 1 or 2 is picked up by the other device 2 or 1 that is within range and also includes an antenna. In some applications, when a device is not communicating, it is switched to standby to reduce power consumption. This is particularly the case for battery-powered devices. When the first device 1 emits an electromagnetic field to initiate a communication with the second device 2, this field is picked up by this second device 2 as soon as it is in range. This field is detected by the circuits 12 of the second device 2 which, if they are on standby, are reactivated. This results in a variation of the load constituted by the circuits of the second device 2 on the resonant circuit generating the field of the first device. In practice, the corresponding variation in phase or amplitude of the emitted field is detected by the first device 1, which then initiates an NFC communication protocol with the second device 2. On the first device 1 side, it is detected in practice if the amplitude of the voltage at the terminals of the resonant circuit 12 drops below a threshold or if the voltage at the terminals of the resonant circuit has a phase shift greater than a threshold. Once the first device 1 has detected the presence of the second device 2 in its field, it initiates a communication establishment procedure, implementing transmissions of requests by the first device 1 and responses by the second device 2.

During a near field communication, the devices 1 and 2 are positioned within range of each other. More specifically, the device 2 is positioned within range of the device 1 so that it can detect the electromagnetic field of device 1. As an example, the device 2 is positioned at a distance generally less than 10 cm from the terminal 1. According to another example, the device 2 is in mechanical contact with the terminal 1.

The device 1 is a terminal that can be, for example, fixed or mobile. It is the device 1 that is in charge of initiating the communication. As an example, the terminal 1 is a payment terminal or a cell phone.

The device 2 is a generally mobile transponder. According to a preferred embodiment, the transponder 2 is a microcircuit card (or smart card), for example a bank card or a transport card. Alternatively, the transponder 2 could be a cell phone or a connected object. The device 2 comprises various electronic circuits adapted to implement various commands sent by the device 1, such as authentication circuits, cryptography circuits, etc. In particular, these different circuits consume more or less power during the execution of a command sent by the device 1. The device 2 may comprise several different power supply modes in which some circuits are powered while others are not, these different power supply modes are described in more detail in connection with FIGS. 2 and 3.

Figure 2:
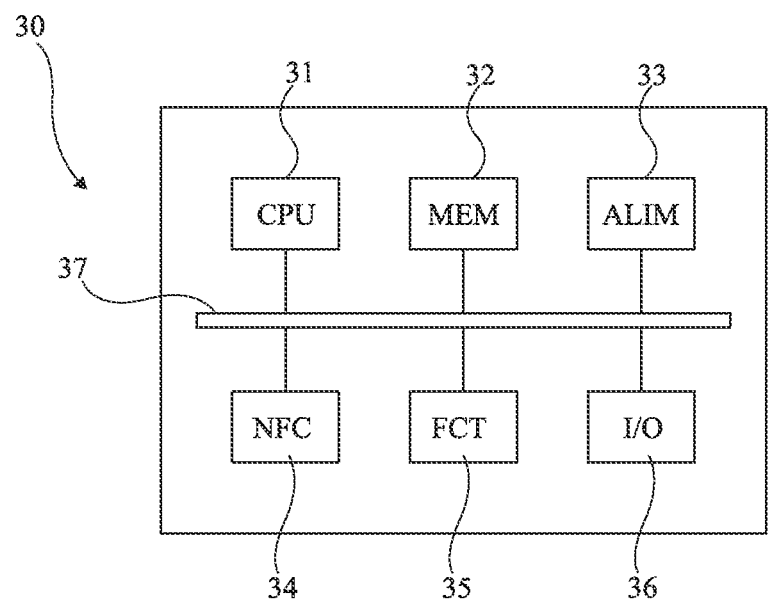
FIG. 2 represents, in a very schematic way and in block form, one embodiment of a device adapted to the near field communication technology.

FIG. 2 is a schematic block diagram representing, very schematically and in block form, an example of the architecture of one embodiment of an electronic device 30 of the type of device 1 or device 2 described in relation to FIG. 1. In other words, the electronic device 30 may be a transponder adapted to implement wireless communication, for example near field communication (NFC).

The electronic device 30 comprises a processor 31 (CPU) adapted to implement various processing of data stored in the memories and/or provided by other circuits of the device 30.

The electronic device 30 further comprises different types of memories 32 (MEM), among which at least one volatile memory and at least one register, typically several registers. The device 30 may further comprise, according to one example, a non-volatile memory, and a read-only memory. Each memory is adapted to store different types of data. The registers are, more particularly, adapted to store specific data such as status data of the device 30. By status data is meant here data that informs about the status of the device 30, or those circuits and components.

The electronic device 30 further comprises power supply circuits 33 (ALIM). The circuits 33 control the power supply of the different circuits and components of the device 30.

The circuits 33 comprise, for example, a battery, the means for recharging the battery, voltage matching circuits, such as voltage regulators, etc. The embodiments of one of the power supply circuits are described in relation to FIGS. 4 and 5.

The electronic device 30 further comprises circuits 34 (NFC) adapted to implement a near field communication, or near field communication module 34, or NFC module 34. The NFC module 34 comprises, for example, oscillating/resonant circuits, data transmitting and receiving circuits, data converting circuits, etc.

The electronic device 30 further comprises circuits 35 (FCT) adapted to implement different functions of the device 30. The circuits 35 are diverse, and may comprise measurement circuits, data analysis circuits, sensors, etc.

The electronic device 30 further comprises input and output (I/O) circuits 36 for the device 30. The circuits 36 comprise connectors allowing the device 30 to transmit and receive data, display devices, etc.

As previously stated, the circuits 33 are adapted to control the power supply, in voltage and in current, of the various circuits and components of the device 30. According to one embodiment, the circuits 33 comprise at least one circuit particularly adapted to control the different power supply modes of the different circuits and components of the device 30. Indeed, all or part of the circuits and components of the device 30 may have several different power supply modes, such as, for example, a full power supply mode and a low power supply mode.

These different power modes may be implemented automatically when the device 30 is in a certain configuration, or in a certain operating mode. The device 30 comprises at least two operating modes. The device 30 may be in the on state or the off state. When the device 30 is in the on state, all of its circuits and components can be used, and can be powered by the power supply circuits 33. When the device 30 is in the off state, all of its circuits and components are intended to be powered down, but some, such as the NFC module 34, are powered up, for example with less power to reduce power consumption. The operating mode of the device 30 may be selected by a user of the device 30.

Furthermore, the different power modes of certain circuits and components of the device 30 may influence the power modes, or powering, of other circuits and components of the device 30. In particular, and according to one embodiment, the NFC module 34 presents multiple power modes that affect the power mode, and power supply, of circuits and components of the device 30.

The NFC module 34 comprises at least three power modes: an active power mode, a standby power mode, and an inactive power mode. When the NFC module 34 is in the active power mode, in other words, the NFC module 34 is active, the NFC module 34 is available for use at any time. All circuits and components within the NFC module 34 are likely to be powered, and it is in this mode that the NFC module 34 is likely to consume the most power. When the NFC module 34 is in the standby power mode, i.e., the NFC module is on standby, the NFC module 34 is expected to be able to provide a service comprising fewer functions, and thus only a portion of the circuits included in the NFC module 34 are likely to be powered. In this mode, the NFC module 34 generally consumes less power than in the active power mode. When the NFC module 34 is in the inactive power mode, or hibernation mode, i.e., when the NFC module 34 is inactive, only a minimal portion of the circuits in the NFC module 34 are likely to be powered. It is in this power mode that the NFC module 34 consumes the least amount of power.

In addition, like the device 30, the NFC module 34 presents multiple operating modes, and can be in the on state or the off state. The operating mode of the NFC module 34 may be selected, for example manually, by a user of the device 30.

The different power modes of the NFC module 34 may be set in different configurations of use of the device 30. The active mode of the NFC module 34 can be implemented when the NFC module 34 is turned on, regardless of whether the device 30 is in the on state or the off state. The standby mode of the NFC module 34 may be implemented when the device 30 is in the on state, and that the NFC module 34 is in the on state. The inactive mode may be implemented when the NFC module 34 is in the off state, whether the device 30 is in the on state or the off state, or when the NFC module 34 is in the on state but the device 30 is in the off state.

The implementation of the various circuit power modes affects the power supply to certain circuits and components of the device 30. This is described in more detail in relation to FIG. 3.

Figure 3:
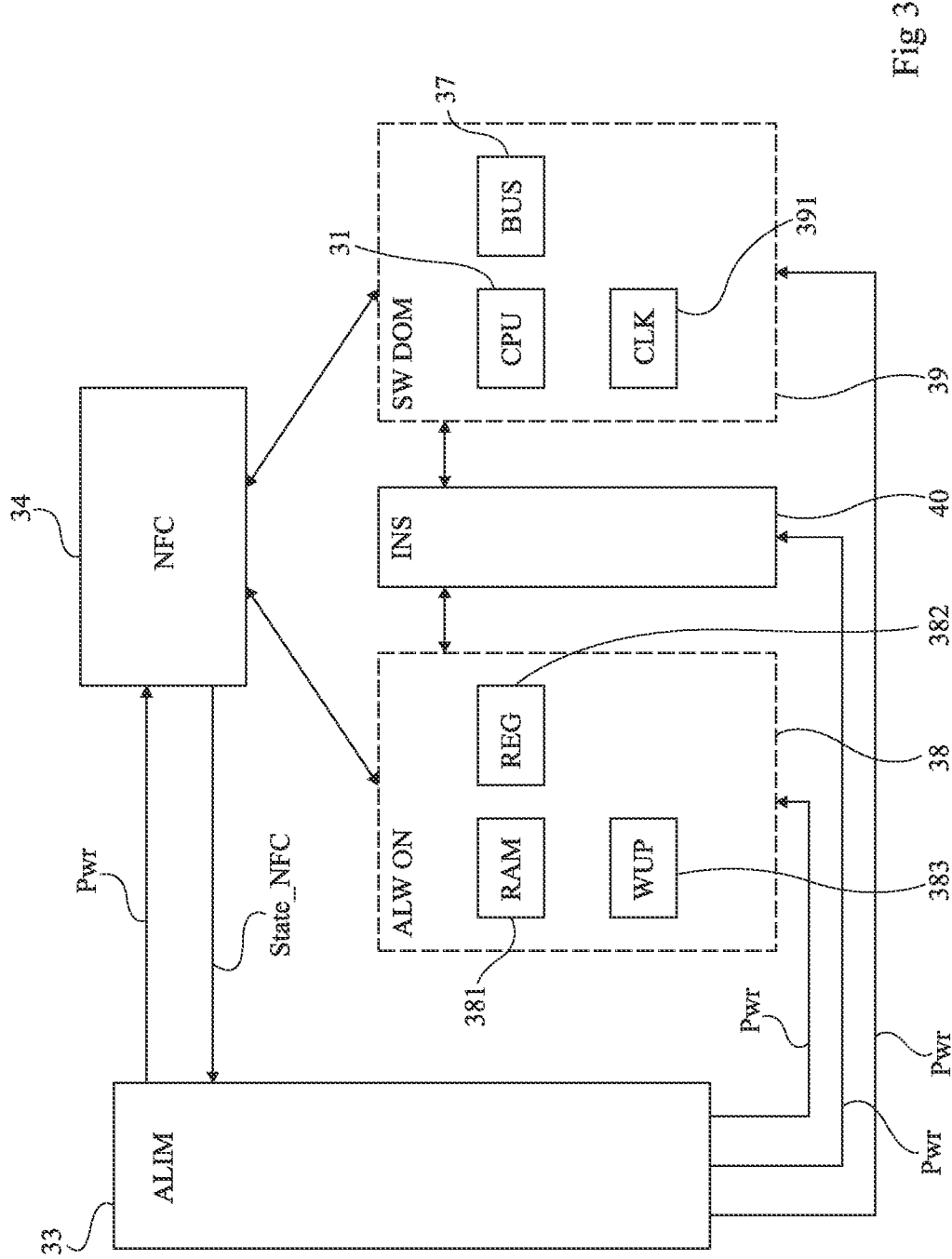
FIG. 3 represents, schematically, in block form, and in greater detail, a part of the embodiment of FIG. 2.

FIG. 3 is a block diagram representing, very schematically and in block form, an example of the architecture of a portion of the electronic device 30 described in relation to FIG. 2. Specifically, FIG. 3 illustrates, more particularly, the NFC module 34 and its interaction with other circuits and components of the device 30.

The NFC module 34 is adapted to interact with various circuits and components of the device 30.

The NFC module 34 is supplied by power Pwr provided by the power supply circuits 33 (ALIM) and are adapted to provide at least State_NFC status information to the power supply circuits 33, for example via the bus 37 not represented in FIG. 3. More particularly, the NFC module 34 is adapted to inform the power supply circuits of the power mode in which it is operating at a given time. Thus, the power supply circuits 33 are adapted to take into account the power mode of the NFC module 34 for supplying other circuits and components of the device 30. Detailed embodiments of the circuits 33 are described in connection with FIGS. 4 and 5.

The NFC module 34 is further adapted to interact with circuits and components of the device 30 divided into two groups: the "always on" group 38 (ALW ON) and the "optional" group 39 (SW DOM).

The "always on" group 38 comprises the circuits and components of the device 30 that are necessary to provide minimal operation of the NFC module 34. The circuits and components of group 38 are supplied by the power Pwr provided by the circuits 33. According to one embodiment, the "always-on" group 38 comprises, at least:
- at least one portion of a volatile memory 381 included in the memories 32 of the device 30.
- a plurality of registers 382 included in the memories 32 of the device 30 and adapted to store state variables of the device 30.
- circuits 383 (WUP) adapted to make the NFC module 34 active.

The circuits 383 comprise, for example, an internal communication bus, such as a bus I2C (Inter-Integrated Circuit), a state machine adapted to indicate that a wireless communication field has been detected or adapted to emit a wireless communication field.

The "optional" group 39 comprises circuits and components of the device 30 that are used to provide normal operation of the NFC module 34 but, are not required to provide minimal operation of the NFC module 34. The circuits and components of the group 38 are supplied by the power Pwr provided by the circuits 33. According to one embodiment, the "optional" group 39 comprises, at least:
the processor 31 of the device 30;
the communication bus 37 of the device 30; and
clock signal generating circuits 391 (CLK) of the device 30.

In practice, a majority of, if not all, of the circuits and components of the device 30 are formed on a single board or a single substrate. The circuits and components in the "always-on" 38 and "optional" 39 groups are isolated from each other by isolation circuits 40 (INS). The isolation circuits 40 are, for example, supplied with the power Pwr by the circuits 33. According to one variant, the isolation circuits 40 need not be powered.

When the NFC module 34 is active, the circuits and components of the "always on" 38 and "optional" 39 groups are supplied by the circuits 33, receiving the power Pwr. The device 30 may be in card mode in a near field communication, but also, for example, in reader mode.

When the NFC module 34 is on standby, only the circuits and components of the "always on" group 38 are powered by the circuits 33, receiving the power Pwr from them. The circuits and components of the "optional" group 40 are not powered, and do not receive the power Pwr. The device 30 can only be in a card mode in a near field communication, for example accessing the latest status variables of the device 30 but cannot be in a reader mode.

When the NFC module 34 is inactive, none of the circuits and components in the "always-on" 38 and "optional" 40 group are powered, and do not receive the power Pwr. The device 30 may not be in a card mode or a reader mode. According to one embodiment, the NFC module 34 of the device 30 may, for example, still detect the presence of a field.

Figure 4:
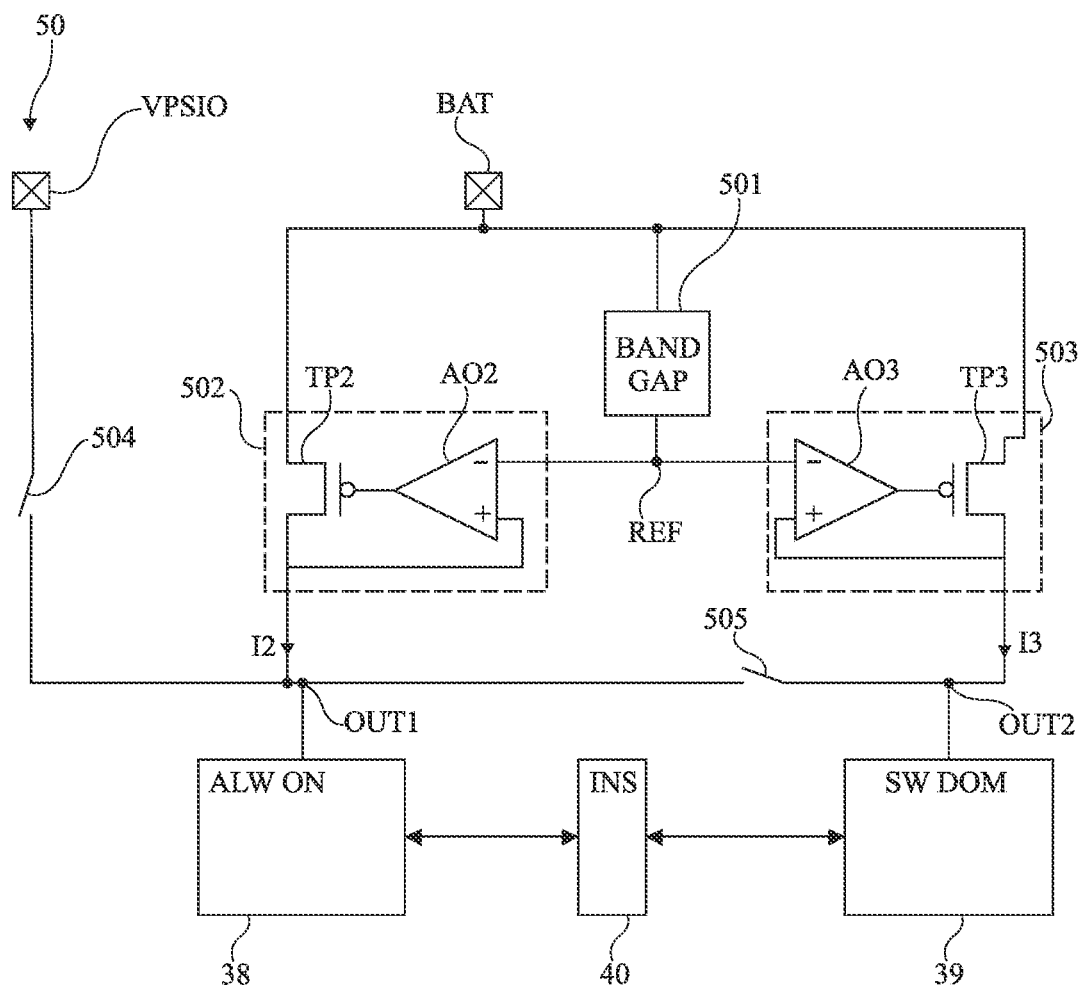
FIG. 4 represents an electrical diagram, partially in block form, of one embodiment of a power supply module of the device of FIG. 2.

FIG. 4 is an electrical diagram, partially in block form, of one embodiment of a power supply circuit 50 that is part of the power supply circuits 33 described in relation to FIGS. 2 and 3. The supply circuit 50 is adapted to supply the "always on" 38 and "optional" 39 groups described in connection with FIG. 3.

The power supply circuit 50 is represented as being coupled to the "always on" 38 and "optional" 39 groups, which in turn are coupled to the isolation circuit 40, for ease of description. Groups 38 and 39, and isolation circuit 40 are not part of circuit 50.

The power circuit 50 comprises two output nodes OUT1 and OUT2. The node OUT1 allows power to be supplied to circuits and components in the "always on" 38 group, and node OUT2 supplies power to circuits and components in the "optional" 39 group. The nodes OUT1 and OUT2 both supply the same supply voltage VPS, referenced to a reference potential, for example ground, not represented in FIG. 4, to the "always-on" 38 and "optional" 39 groups. According to one example of an embodiment, the voltage VPS is between 1 and 5 V, for example between 1 and 1.5 V, for example of the order of 1.25 V.

The power supply circuit 50 comprises two input nodes BAT and VPSIO. The node BAT supplies electronic power from a battery of the circuits 33. More particularly, the node BAT provides a supply voltage VBAT that is greater than the voltage VPS. The voltage VBAT is, for example, greater than 1.5 V, for example of the order of 2.5 V. According to one example, the voltage VBAT is referenced to a reference potential, for example ground. According to one embodiment, the node VPSIO is a power node used to supply communication nodes of the NFC module 34. More particularly, the node VPSIO is adapted to power an internal communication circuit of the device 30. The node VPSIO is adapted to supply the voltage VPS directly, i.e., without the need to use a voltage regulator circuit. According to one example, the node VPSIO does not supply voltage when the device 30 is turned off.

The power supply circuit 50 further comprises a bandgap voltage regulator circuit 501. The circuit 501 comprises an input node coupled, preferably connected, to the node BAT, and an output node coupled, preferably connected, to a node REF. The circuit 501 provides a reference voltage from the voltage delivered by the battery at the node BAT.

The power supply circuit 50 further comprises two voltage regulators 502 and 503. The voltage regulators 502 and 503 each comprise two input nodes coupled, preferably connected, to the nodes BAT and REF. The voltage regulators 502, respectively 503, comprise an output node coupled, preferably connected, to the output node OUT1, respectively OUT2. The voltage regulators 502 and 503 are sized to provide, from the voltage output by the node BAT, the voltage VPS. The voltage regulator 502 is dimensioned to supply, on the node OUT2, a current I2 less than the current I3 supplied by the voltage regulator 503 on the node OUT3. According to one example, the current I2 is at least ten times less than the current I3. According to one example, the current I2 is of the order of 2 mA, and the current I3 is of the order of 60 mA.

Each voltage regulator 502, 503 comprises a transistor TP2, TP3, and an operational amplifier AO2, AO3. According to one example, the transistors TP2 and TP3 are P-channel metal-oxide gate field effect transistors, also known as PMOS transistors.

A first conduction terminal of transistor TP2 is coupled, preferably connected, to the node BAT, and a second conduction terminal of the transistor TP2 is coupled, preferably connected, to the node OUT1. The gate of transistor TP2 is coupled, preferably connected, to an output of the operational amplifier AO2. The operational amplifier AO2 comprises an inverting input (−) coupled, preferably connected, to the node REF, and a non-inverting input (+) coupled, preferably connected, to the node OUT2.

A first conduction terminal of the transistor TP3 is coupled, preferably connected, to node BAT, and a second conduction terminal of the transistor TP3 is coupled, preferably connected, to the node OUT1. The gate of the transistor TP3 is coupled, preferably connected, to an output of the operational amplifier AO3. The operational amplifier AO3 comprises an inverting input (−) coupled, preferably connected, to the node REF, and a non-inverting input (+) coupled, preferably connected, to the node OUT3.

The circuit 50 further comprises two switches 504 and 505 adapted to define by which input node of the circuit 50, the groups 38 and 39 are powered. The switch 504 couples, preferably connects, the nodes VPSIO and OUT1. The switch 505 couples, preferably connects, the nodes OUT1 and OUT2. The switches 504 and 505 are controlled by the signals (not represented in FIG. 4) the values of which are defined by the different power modes of the NFC module 34.

The operation of circuit 50 is as follows.

When the device 30 is turned on, and the NFC module 34 is active, all circuits and components in the "always on" 38 and "optional" 39 groups are powered by the battery. The switch 505 is then in the on state, and switch 504 is in the off state. This configuration is the same, if the device 30 is in the off state, and the circuits 34 are in an active power mode.

According to an alternative embodiment, when the device 30 is in the off state, and the NFC module 34 is active, all circuits and components in the "always on" 38 and "optional" 39 groups are supplied by the node VPSIO. The switch 504 is then in the on state, and switch 505 is in the off state.

When the device 30 is in the on state, and the NFC module 34 is on standby, only the circuits and components in the "always on" 38 group are supplied and are supplied by the node VPSIO. The circuits and components in the "optional" 39 group are not powered. The switch 504 is then in the on state, and the switch 505 is in the off state.

When the device 30 is in the off state, and the NFC module 34 is on standby, only the circuits and components in the "always on" 38 group are supplied, and they are powered by the battery. The circuits and components of the "optional" group 39 are not powered. The switches 504 and 505 are in the off state.

When the NFC module 34 is inactive, whether the device 30 is in the on state or is in the off state, the circuits and components in the "always on" 38 and "optional" 39 groups are not powered.

One advantage of this embodiment is that using the node VPSIO to supply the circuits and components of the "always on" group 38 when the device 30 is in the on state and when the module 34 is in an active power mode, allows to reduce the power consumption of the device 30. Indeed, this embodiment allows the voltage regulator 502 not to be used, and thus saving its power consumption. According to an example of one embodiment, this mode of embodiment allows to reduce the current consumption by about 15 µA, and to reduce the consumption from about 35 µA to about 20 µA.

Figure 5:
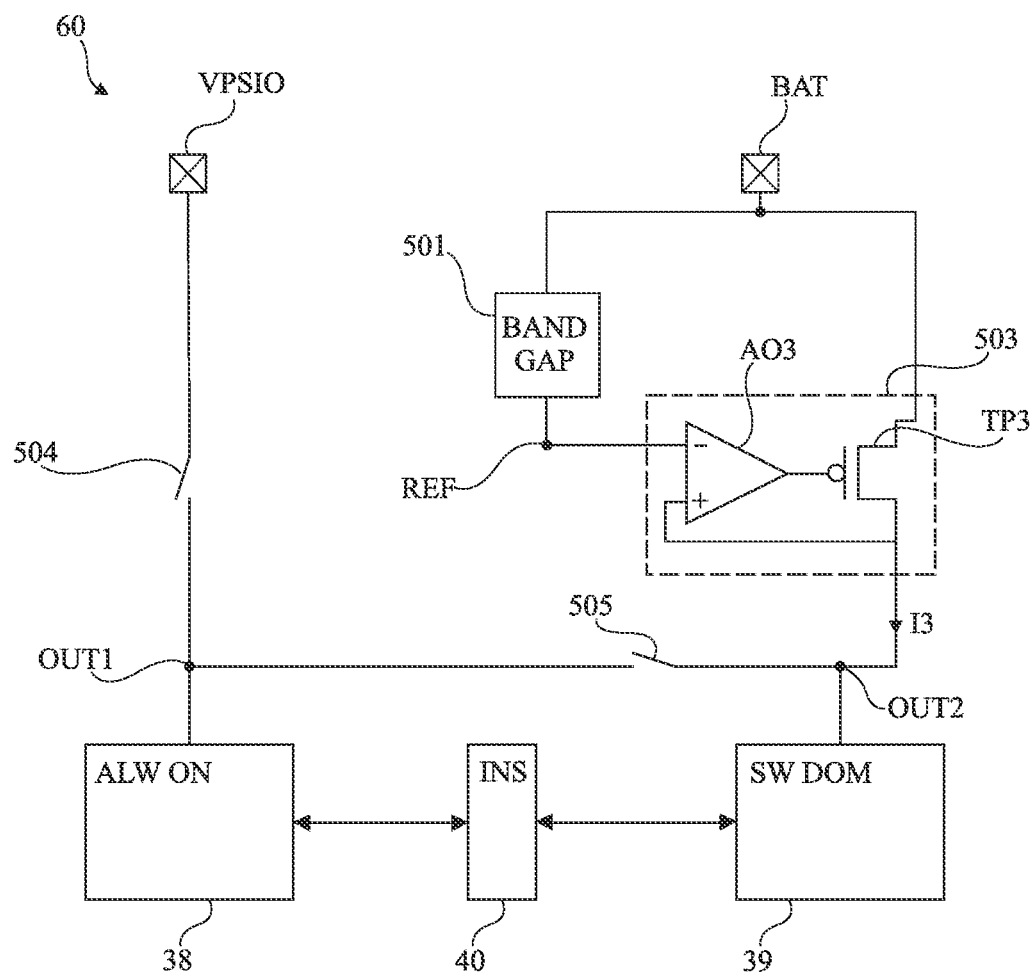
FIG. 5 represents an electrical diagram, partially in block form, of another embodiment of a power module of the device of FIG. 2.

FIG. 5 is an electrical diagram, partially in block form, of one embodiment of a power supply circuit 60 that is part of the power supply circuits 33 described in in relation to FIGS. 2 and 3. The power supply circuit 60 is adapted to supply power to the "always on" 38 and "optional" 39 groups described in relation to FIG. 3.

The circuit 60 is similar to and has elements in common with circuit 50 described in relation to FIG. 4. The elements common to circuits 60 and 50 are not described in detail again here, and only the differences between circuits 50 and 60 are highlighted.

Like the power circuit 50, the power circuit 60 is represented as being connected to the "always-on" 38 and "optional" 39 groups described in relation to FIG. 3, which are themselves coupled to the isolation circuit 40, for ease of description. These groups 38 and 39, and the isolation circuit 40 are not part of the circuit 50.

Unlike circuit 50, circuit 60 comprises only the voltage regulator 503, and does not include the voltage regulator 502. The power from the voltage regulator 502 is replaced by power from the node VPSIO.

The operation of circuit 60 is as follows.

When the device 30 is in the on state, and the NFC module 34 is active, all circuits and components in the "always on" 38 and "optional" 39 groups are powered by the battery. Switch 505 is then in the on state, and switch 504 is in the off state. This configuration is the same, if the device 30 is in the off state, and the circuits 34 are in an active power mode.

According to an alternative embodiment, when the device 30 is in the on state, and the NFC module 34 is active, all circuits and components in the "always on" 38 and "optional" 39 groups are supplied by the node VPSIO. The switch 504 is then in the on state, and switch 505 is in the off state.

When the device 30 is in the on state, and the NFC module 34 is on standby, only the circuits and components in the "always on" group 38 are supplied and are supplied by the node VPSIO. The circuits and components in the "optional" 39 group are not supplied. The switch 504 is then in the on state, and switch 505 is in the off state When the device 30 is in the off state, and the NFC module 34 is on standby, only the circuits and components in the "always on" group 38 are supplied and are supplied by the node VPSIO. The circuits and components in the "optional" group 39 are not supplied. The switch 504 is then in the on state, and switch 505 is in the off state When the NFC module 34 is in an inactive mode, whether the device 30 is in the on state or is in the off state, the circuits and components in the "always on" 38 and "optional" 39 groups are not supplied.

According to an alternative embodiment, when the device 30 is in the on state, and the NFC module 34 is inactive, only the circuits and components of the "always on" group 38 are supplied and are supplied by the node VPSIO. The circuits and components of the "optional" group 39 are not supplied. The switch 504 is then in the on state, and switch 505 is in the off state An advantage of this embodiment is that it saves the space occupied by the voltage regulator 502. The device 30 may be, in this case, an Internet of Things device, i.e., a connected object.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An electronic device comprising:
    a first near field communication module;
    a power supply circuit comprising a battery, at least one first voltage regulator and at least one node configured to provide a first supply voltage;
    at least one portion of a volatile memory;
    at least one register; and
    at least one first circuit configured to activate the first near field communication module,
    wherein the power supply circuit is configured to power the at least one portion of the volatile memory, the at least one register and the at least one first circuit with the first supply voltage when the electronic device is in an on state and when the first near field communication module is in a standby mode.

2. The device according to claim 1, wherein the at least one first circuit comprises an internal communication bus of the device, and/or a state machine configured to detect a state of the first near field communication module.

3. The device according to claim 1, wherein the first voltage regulator is configured to power all circuits of the device, with which the first near field communication module is configured to communicate, with a second supply voltage equal to the first supply voltage from a third supply voltage of the battery when the electronic device is in the on state and when the first near field communication module is active.

4. The device according to claim 1, wherein the first voltage regulator is configured to power all circuits of the device, with which the first near field communication module is configured to communicate, when the device is in an off state and when the first near field communication module is active.

5. The device according to claim 1, wherein the power supply circuit is configured to power none circuit of the device, with which the first near field communication module is configured to communicate, when the first near field communication module is inactive.

6. The device according to claim 1, wherein the power supply circuit further comprises a second voltage regulator configured to provide a fourth supply voltage equal to the first supply voltage from a third supply voltage of the battery.

7. The device according to claim 6, wherein the first voltage regulator is configured to provide a first current equal to at least ten times a second current providable by the second voltage regulator.

8. The device according to claim 6, wherein the second voltage regulator is configured to power all circuits of the device, with which the first near field communication module is configured to communicate, when the device is in the off state and when the first near field communication module is in the standby mode.

9. The device according to claim 1, wherein the first supply voltage is between 1 V and 1.5 V, inclusive.

10. A method for powering an electronic device, wherein the electronic device comprises a first near field communication module, a power supply circuit, at least one portion of a volatile memory, at least one register and at least one first circuit configured to activate the first near field communication module, the method comprising:
    powering, by the the power supply circuit, the at least one portion of the volatile memory, the at least one register, and the at least one first circuit with a first supply voltage when the electronic device is in an on state and when the first near field communication module is in a standby mode.

11. The method according to claim 10, wherein the power supply circuit comprises a battery, at least one first voltage regulator, and at least one node for providing the first supply voltage.

12. The method according to claim 11, further comprising powering, by the first voltage regulator, all circuits of the device, with which the first near field communication module is configured to communicate, with a second supply voltage equal to the first supply voltage from a third supply voltage provided by the battery when the electronic device is in the on state and when the first near field communication module is active.

13. The method according to claim 11, further comprising powering, by the first voltage regulator, all circuits of the device, with which the first near field communication module is configured to communicate, when the device is in an off state and when the first near field communication module is active.

14. The method according to claim 11, further comprising not powering, by the power supply circuit, any circuit of the device with which the first near field communication module is configured to communicate, when the first near field communication module is inactive.

15. The method according to claim 11, wherein the power supply circuit further comprises a second voltage regulator configured to provide a fourth supply voltage equal to the first supply voltage from a third supply voltage provided the battery.

16. The method according to claim 15, wherein the first voltage regulator provides a first current equal to at least ten times a second current provided by the second voltage regulator.

17. The method according to claim 15, further comprising powering, by the second voltage regulator, all circuits of the device, with which the first near field communication module is configured to communicate, when the device is in the off state and when the first near field communication module is in the standby mode.

18. The method according to claim 11, wherein the first supply voltage is between 1 V and 1.5 V, inclusive.

* * * * *